United States Patent [19]

Ziavras

[11] Patent Number: 5,400,987

[45] Date of Patent: Mar. 28, 1995

[54] VARIABLE ANGLE LATCHING MECHANISM FOR SPACECRAFT

[75] Inventor: John Ziavras, Hermosa Beach, Calif.

[73] Assignee: Hughes Aircraft Company, Los Angeles, Calif.

[21] Appl. No.: 52,883

[22] Filed: Apr. 26, 1993

[51] Int. Cl.$^6$ .............................................. B64G 1/44
[52] U.S. Cl. .................................... 244/173; 292/113; 292/219; 292/341.18
[58] Field of Search ................... 244/158 R, 173, 159; 292/56, 113, 341.18, 240, 194, 219, 224; 160/233, 234

[56] References Cited

U.S. PATENT DOCUMENTS

| | | | |
|---|---|---|---|
| 1,229,709 | 6/1917 | Brinckerhaff | 292/341.18 |
| 4,538,843 | 9/1985 | Harris | 292/341.18 |
| 4,880,188 | 11/1989 | Roth et al. | 244/173 |
| 4,884,464 | 12/1989 | Grattarola | 244/173 |
| 5,319,905 | 6/1994 | Szirtes | 160/233 |

*Primary Examiner*—Galen L. Barefoot
*Attorney, Agent, or Firm*—Terje Gudmestad; Wanda K. Denson-Low

[57] ABSTRACT

A variable angle latching mechanism is provided which readily permits adjustment of the deployment angle of a solar array mechanism or other spacecraft deployable. Latch engagement is possible over a wide angular range with virtually zero backlash. In one embodiment a movable portion (20) of the latching mechanism is pivotally mounted to a stationary portion (26) of the latching mechanism and carries a catch element (10) that is adapted to move into latching engagement with a latch element (30) pivotally mounted on the stationary element. The latch element is linearly positioned on the movable portion by a single shim element(30) to thereby establish the angle of deployment of the movable member and thus the deployable. The angle of deployment of the mechanism is set at assembly by selection of shim thickness. In a second embodiment of the invention, the catch arm is an integral part of a slider which is linearly positioned by a motor. The motor may be controlled from an earth station and thereby permits adjustment of the deployment angle after deployment in space.

7 Claims, 5 Drawing Sheets

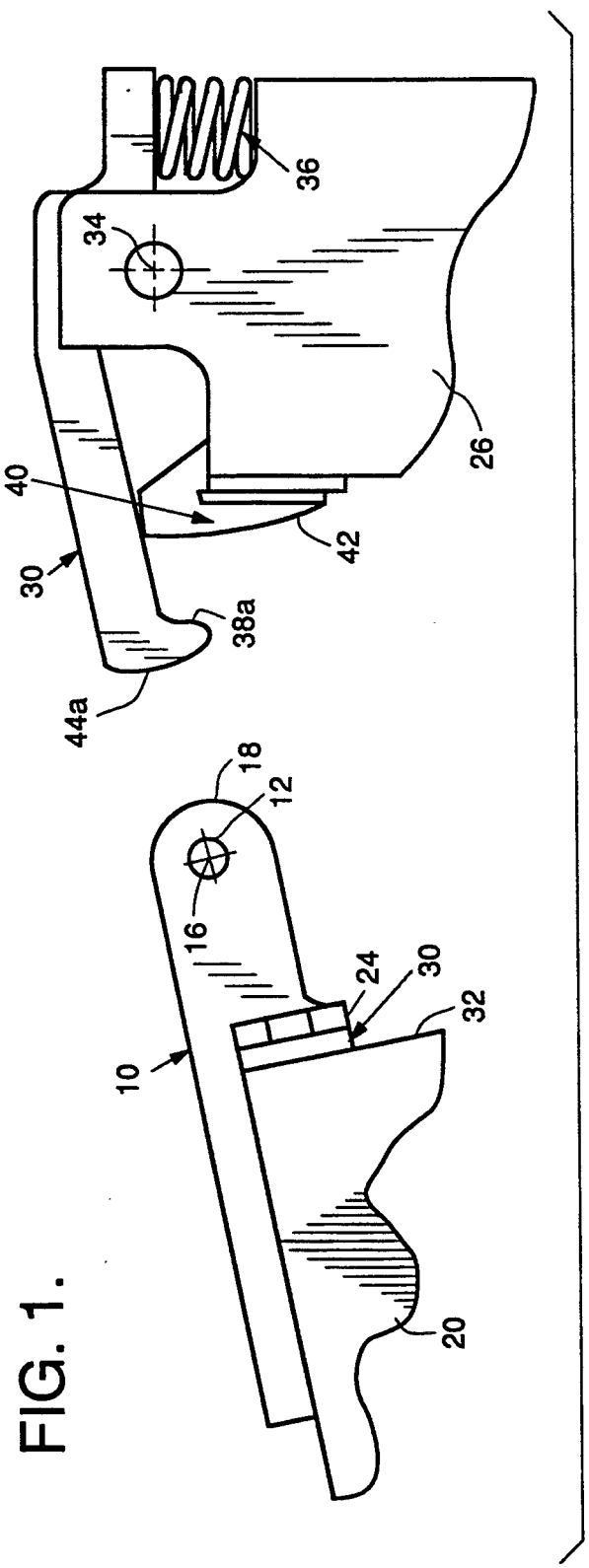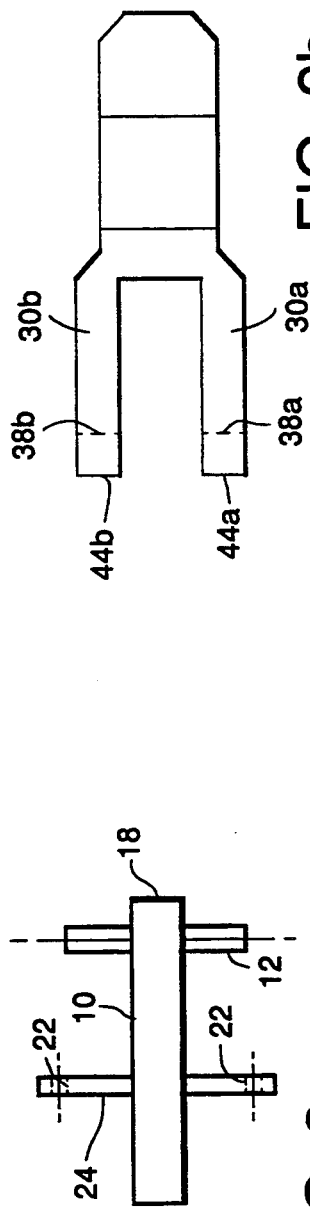
FIG. 1.
FIG. 2a.
FIG. 2b.

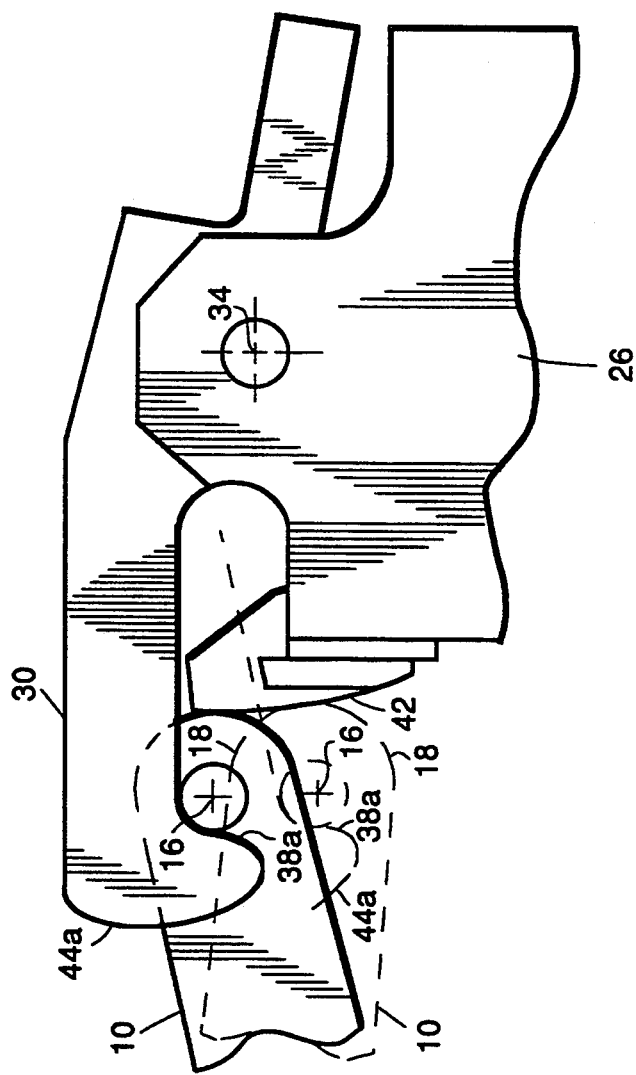

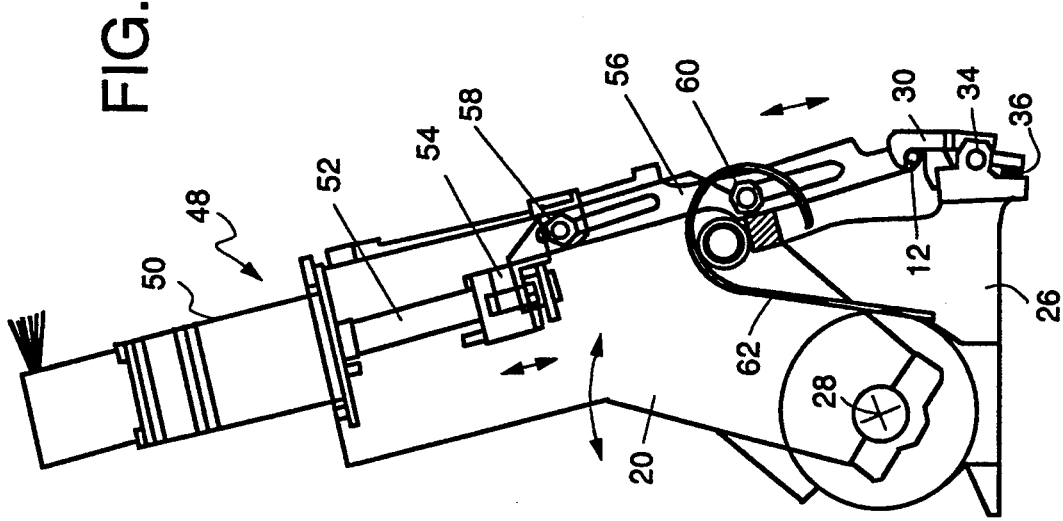
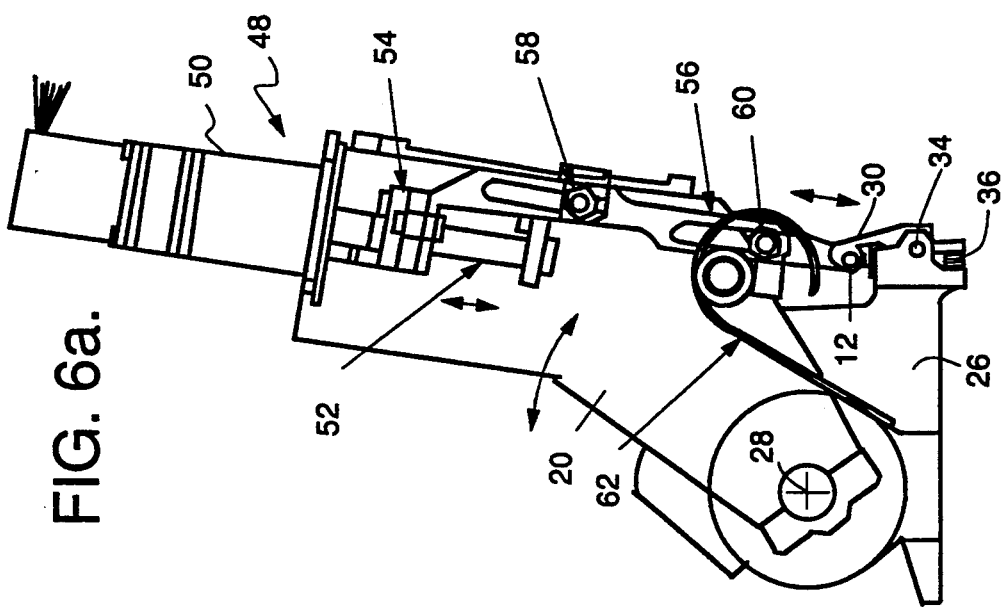

VARIABLE ANGLE LATCHING MECHANISM FOR SPACECRAFT

TECHNICAL FIELD

This invention relates to latching mechanisms and more particularly to a variable angle latch for use on spacecraft panel deployment mechanisms associated with such devices as solar panel arrays wherein the design of the latch and catch elements permit zero backlash engagement over a variable deployment angle.

BACKGROUND ART

Solar panel arrays for spacecraft are deployed by lightweight spring-driven viscous-damped actuators. Latches are necessary to maintain the panels in position because the large deployed mass of the array induces loads which could overcome the deployment springs during certain spacecraft maneuvers. Prior art low-backlash latches add significant complexity and cost to the mechanism assembly process. With such latch designs, low backlash and required deployment angle are difficult to achieve simultaneously, requiring an iterative process of shim machining in multiple locations, installation, then backlash and angle measurement. Furthermore, these latches can be set to only one predetermined angle. Other deployment mechanisms have used spring loaded latch pins which slide along a plate and engage by dropping into a hole in a stationary part. Both types of previously used latches introduce backlash and offer no means of varying the deployment angle.

SUMMARY OF THE INVENTION

With the forgoing in mind, it is an object of the present invention to provide an essentially zero backlash latch mechanism including latch, catch and stop geometry which allows latching engagement over a range of angular positions.

It is another object of the present invention to provide a latching mechanism for a solar array or other spacecraft deployable which permits the deployable to be latched in a nominal or initially desired position and thereafter repositioned without disengagement.

In accordance with one embodiment of the present invention, a variable angle latch device is provided which allows adjustment of the deployment angle of a solar panel mechanism at assembly simply by varying a single shim thickness. Latch engagement is possible over a wide angular range with virtually zero backlash. In a second embodiment of the invention, one portion of the latch is driven by a motorized actuator so that after the solar panel mechanism is deployed from its stowed position and latched in an initial position it may be repositioned by commands from a ground station to the motorized actuator. The variable angle latch remains engaged during repositioning with little or no backlash. The adjustable feature permits customization of the deployed position of each solar array in final assembly to compensate for solar panel manufacturing tolerances, dry out and thermal distortion. By permitting the solar arrays to be custom positioned at assembly or adjusted while in orbit, the present invention provides improved performance and extends the life of the spacecraft.

The variable angle latch of the present invention thus simplifies the development of various deployment mechanisms such as those used for deploying reflectors or antennas where it is desired to change the position of the deployable about the deployment axis. The simplification results in an improved deployment mechanism design and reduces its weight and complexity.

BRIEF DESCRIPTION OF THE DRAWINGS

A more complete understanding of the present invention may be had from the following detailed description, which should be read in conjunction with the drawings in which:

FIG. 1 is a side elevation view of the major components of a first embodiment of the latching mechanism of the present invention;

FIGS. 2a and 2b show top elevation views of the catch and latch elements of the latching mechanism;

FIG. 5 shows the movement of the catch pin center and latch surface along respective circular arcs as the deployment angle is varied; and FIGS. 6a and 6b show a second embodiment of the invention in which a motorized linear actuator and slider are used to adjust the deployment angle.

DETAILED DESCRIPTION OF PREFERRED EMBODIMENT

Figure 3A:
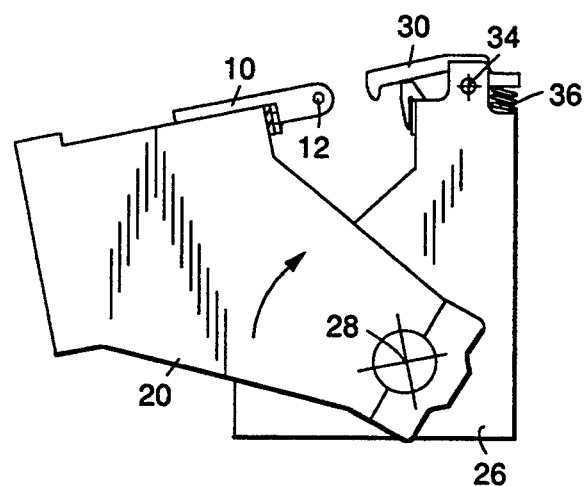
FIGS. 3a, 3b and 3c shows the latching sequence.

Referring now to the drawings and initially to FIGS. 1, 2a and 2b, a first embodiment of the variable angle latch device of the present invention is shown wherein the device comprises a catch element 10 having a catch pin 12 extending therethrough along a catch pin axis 16 transverse to the catch element. The catch element 10 has a surface 18 which is a radius concentric with the catch pin axis 16. The catch element 10 is mounted to a movable portion 20 of the latching mechanism by fasteners (not shown) which extend through openings 22 in the integral flange portions 24 of the catch element, see FIG. 2a. The movable portion 20 is pivotally mounted to a stationary portion 26 of the latching mechanism about a pivot axis 28, see FIG. 3a. The portion 26 is in turn fixedly mounted to the spacecraft (not shown) and the movable portion 20 carries the solar array (not shown).

The latching mechanism further comprises a latch element 30 having latch fingers 30a and 30b, see FIG. 2b, separated sufficiently to permit the catch element 10 to pass therebetween during the latching process. The latch arm 30 is pivotally mounted to the stationary portion 26 about a pivot axis 34 which is parallel to the pivot axis 28. A compression spring 36 biases the latch arm 30 in a counterclockwise direction to the position shown, in the path of travel of the catch element 10. Each finger 30a and 30b of latch arm 30 is provided with latching surfaces 38a and 38b respectively which are a radius concentric with the latch element pivot axis 34. A stop element 40, suitably mounted to the stationary portion 26, is provided with a stop surface 42 which is also a radius concentric with the latch arm pivot axis 34. Each finger 30a and 30b of latch element 30 is provided with a surface 44a and 44b respectively which is in the path of travel of the catch pin 12 and is engaged by the catch pin 12 during the latching process to cause the latch arm 30 to pivot clockwise about the axis 34.

A shim element 30 is located behind the flanges 24 and is secured to the surface 32 of the movable portion 20 by the aforementioned fasteners. The shim element 30 adjusts the location of the catch pin 12 on the movable portion 20 relative to the surface 30 of the portion 20. The thickness of the shim element 30 establishes the angle through which the movable portion 20 will travel before latch-up with the latch arm 30 on the stationary portion 26.

Figure 3B:
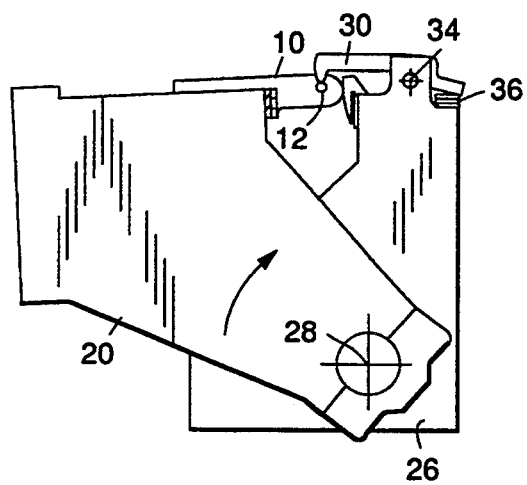
Figure 3C:
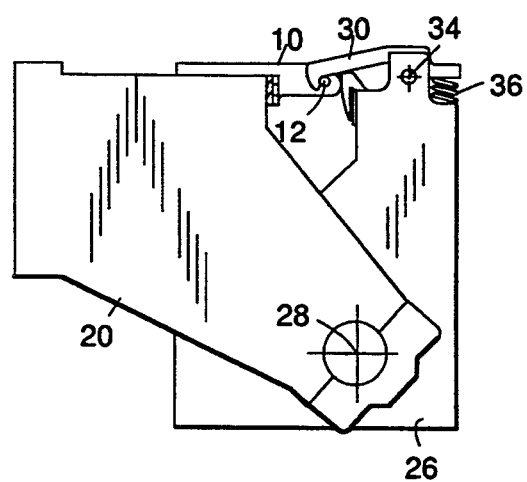

As the array mechanism deploys, the movable portion 20 pivots in a clockwise movement about the axis 28 from the position shown in FIG. 3a, toward the position shown in FIG. 3b where the catch element 10 passes between the fingers 30a and 30b and the catch pin 12 contacts the latch surfaces 44a and 44b of the fingers 30a and 30b. At the position shown in FIG. 3b the latch arm has pivoted clockwise about the axis 34 against the bias of the compression spring 36. The compression spring 36 maintains the latch surfaces 44a and 44b in contact with the catch pin 12 and causes the latch arm 30 to pivot counterclockwise to the position as shown in FIG. 3c where the latch fingers 30a and 30b capture the and secure the pin 12 as the catch element surface 18 engages the stop surface 34.

Figure 4A:
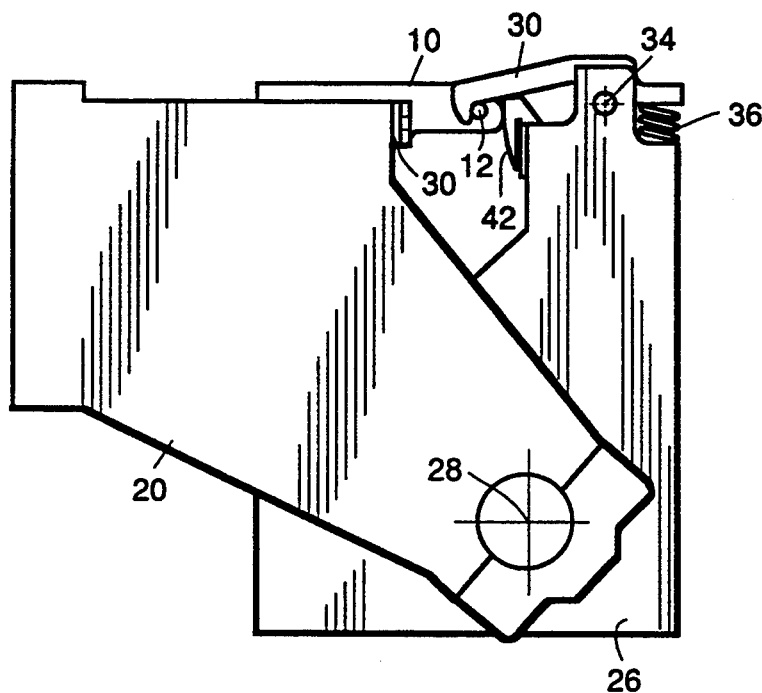
FIGS. 4a and 4b show how shim size adjusts the deployment angle.
Figure 4B:
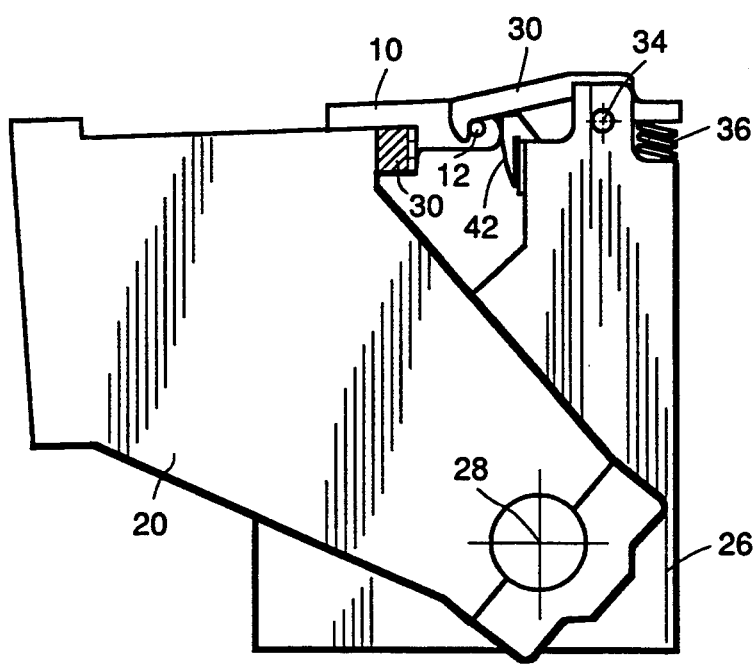

As shown in FIGS. 4a and 4b, the angular position of the movable portion may be customized at assembly by varying the thickness of the shim 28 mounted behind the flanges 24 of the catch element 10. In FIG. 4a, a relatively thin shim is employed and provides a 90° angle of deployment. In FIG. 4b, a relatively thick shim is employed and provides an deployment angle of 85°. As the shim thickness is increased the location of the catch pin 12 is adjusted such that engagement of the stop surfaces 18 and 42 occur at a smaller pivot angle.

Referring now to FIG. 5 it will be noted that the pin axis or center of the catch pin 12 is positioned along a circular arc through the pivot axis 34 for all latching angles. In the solid line position of the catch element 10 the shim thickness used has produced an 80° deployment angle. In the phantom line position 10a the shim thickness used has produced a 100° deployment angle. The inner latch surfaces 38a and 38b trace out, in their movement between the two positions shown, concentric circular arcs, and may therefore engage the catch pin 12 in any position within its working range so that no backlash is introduced in any position in which the latch engages.

Referring now to FIGS. 6a and 6b, a second embodiment of the variable angle latch device is shown. A motorized linear actuator and slider assembly generally designated 48 is used instead of the catch element and shim described in FIG. 1. The assembly 48 includes a motor and gearhead unit 50 which is controllable from an earth station. The unit 50 drives a screw 52 to position a nut 54 along the screw axis. The catch element in this embodiment is a slider 56 which is mounted to the nut for translation therewith. The movable portion 20 is provided with guides 58 and 60 which confine movement of the slider 56 long a path which is parallel to and offset from the screw axis. The end of the slider 56 has the same geometry as the catch element 10 in FIG. 1.

The slider may be positioned to a nominal location during assembly prior to launch of the spacecraft to achieve a desired initial deployment angle when orbit is attained. While in orbit, linear actuation of the slider 56 by the motor 50 will adjust the deployment angle as shown in FIGS. 6a and 6b. A deployment mechanism using this device will latch up as described with respect to FIGS. 3a-3c upon deployment from a stowed position under the action of a deployment spring 60 operating against a damping device (not shown). While a rotary motor, lead screw, and nut are employed in FIGS. 6a and 6b, any linear actuator may be used to position the slider to effect an angular adjustment.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A variable angle latching mechanism comprising a stationary portion and a movable portion, means pivotally mounting said movable portion to said stationary portion about a mechanism pivot axis, a latch element pivotally mounted to said stationary portion about a latch pivot axis, spring means for biasing said latch element about said latch pivot axis toward a latched position, said latch element having an inner latch surface which is a radius concentric with said latch pivot axis, said stationary portion having a first stop surface which is a radius concentric with said latch pivot axis, a catch element adapted to be mounted to the movable portion of said latching mechanism, said catch element including a catch pin movable therewith and defining a catch pin axis, said catch element having a second stop surface which is a radius concentric with said catch pin axis, said latch element having an outer surface in the path of travel of said catch pin and effective upon engagement by said catch pin to cause said latch element to pivot out of the path of travel of said catch pin to permit said second stop surface to engage said first stop surface, whereupon said latch element returns to said latched position capturing said catch pin against said inner surface of said latch element, means for adjusting the location of said catch pin on said movable portion to control the pivotal position of the movable portion at which the catch element captures and secures the catch pin.

2. The mechanism defined in claim 1 wherein said latch element includes a pair of spaced apart latch fingers which receive said catch element to permit engagement of said catch pin with said outer surface, and wherein said latch element pivot axis is parallel to said mechanism pivot axis and said catch pin axis is transverse to said movable element.

3. The mechanism defined in claim 2 wherein said means for adjusting the position of said catch pin is a shim.

4. The mechanism defined in claim 2 wherein said means for adjusting the position of said catch pin comprises motor means mounted to said movable portion and including a rotatable element, motion conversion means coupling said latch element to said rotatable element to linearly position said latch element in response to energization of said motor means, whereby the angle of deployment is adjustable after said mechanism is deployed in said latched position by energizing said motor means.

5. The mechanism defined in claim 4 wherein said rotatable element is a screw and said motion conversion means is a nut adapted to be positioned along the axis of said screw, said movable portion including means for guiding said catch element along a path offset from and parallel to said axis of said screw.

6. The mechanism defined in claim 5 wherein said stationary portion is mounted to a spacecraft and said movable portion carries a deployable array.

7. A variable angle latching mechanism comprising;
a latch element adapted to be pivotally mounted to a stationary portion about a latch pivot axis, spring means for biasing said latch element about said latch pivot axis toward a latched position, said latch element having an inner latch surface which is a radius concentric with said latch pivot axis, said stationary portion having a first stop surface which is a radius concentric with said latch pivot axis, a catch element including a catch pin movable therewith and defining a catch pin axis, said catch element having a second stop surface which is a radius concentric with said catch pin axis, said latch element having an outer surface in the path of travel of said catch pin and effective upon engagement by said catch pin to cause said latch element to pivot out of the path of travel of said catch pin and permit said second stop surface to engage said first stop surface, whereby said latch element returns to said latched position capturing said catch pin against said inner surface of said latch element.

* * * * *